July 2, 1929.  M. W. CARROLL  1,718,998
PIPE HOLDER
Filed June 14, 1926  2 Sheets-Sheet 1

Inventor
Monroe W. Carroll
By Hardway Cathey
Attorneys

July 2, 1929.  M. W. CARROLL  1,718,998
PIPE HOLDER
Filed June 14, 1926   2 Sheets-Sheet 2

Inventor
Monroe W. Carroll

By Hardway Mather
Attorneys

Patented July 2, 1929.

1,718,998

UNITED STATES PATENT OFFICE.

MONROE W. CARROLL, OF BEAUMONT, TEXAS.

PIPE HOLDER.

Application filed June 14, 1926. Serial No. 115,742.

This invention relates to new and useful improvements in a pipe holder.

One object of the invention is to provide a pipe holder of the character described embodying a slip ring adapted to be seated in the rotary table, of a rotary drilling machine, and having a downwardly converging seat, and a sectional pipe engaging slip adapted to seat in said ring and having engaging jaws adapted to engage with the pipe to be held.

Another object of the invention is to provide a pipe holder of the character described, having pipe engaging jaws equipped with roller bearings adapted to contact with the seat of said slip ring to prevent the jaws from sticking therein, to the end that the slips may be more easily removed.

A further feature of the invention resides in a novel cage-like structure wherein the jaws are mounted, as well as the novel type of slip ring having the internal tracks against which the roller bearings of the jaws work, as well as the means for holding the slips against rotation in said ring.

With the above and other objects in view this invention has particular relation to certain novel features of construction, operation and arrangement of parts, an example of which is given in this specification and illustrated in the accompanying drawings, wherein:—

Figure 1:
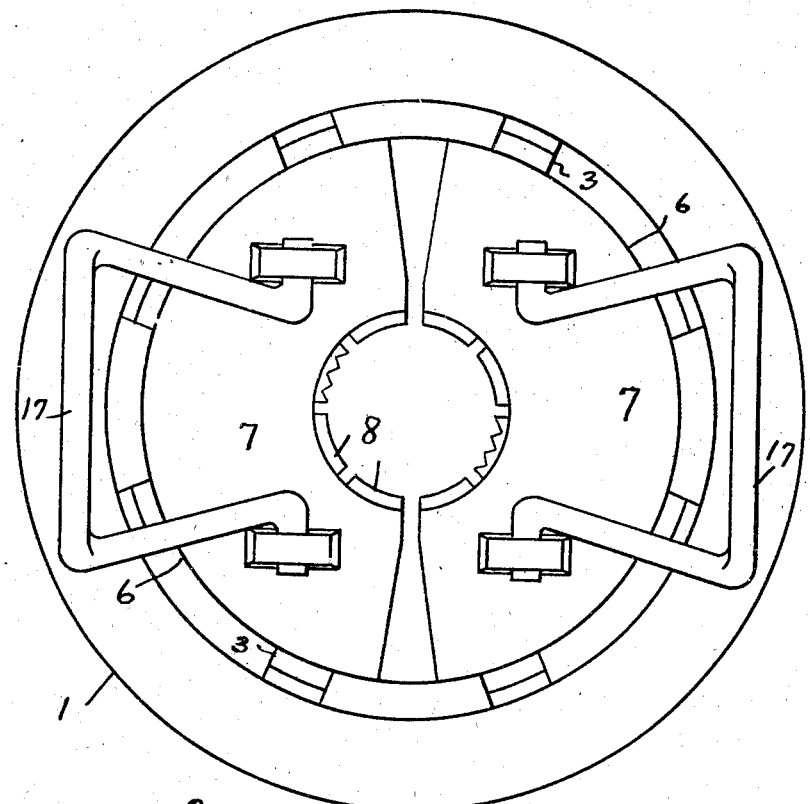
Figure 1 shows a plan view of the device.
Figure 2:
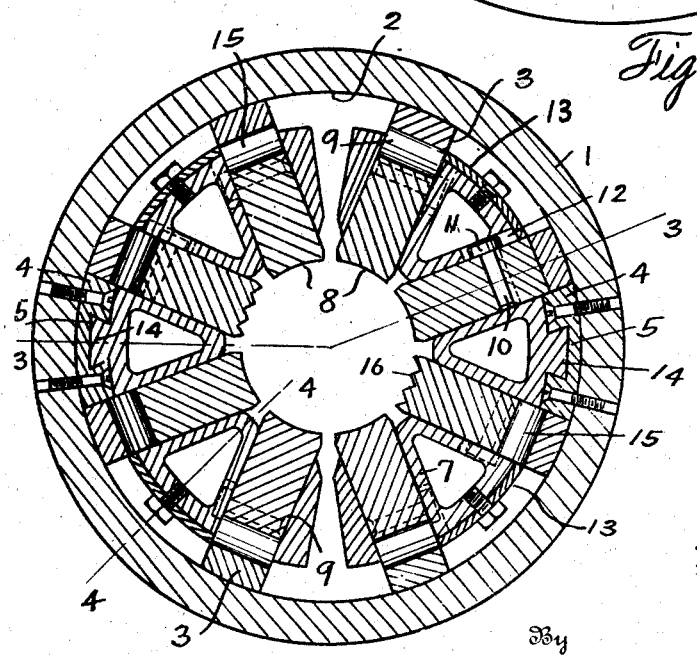
Figure 2 shows a transverse sectional view taken on the line 2—2 of Figure 3.
Figure 3:
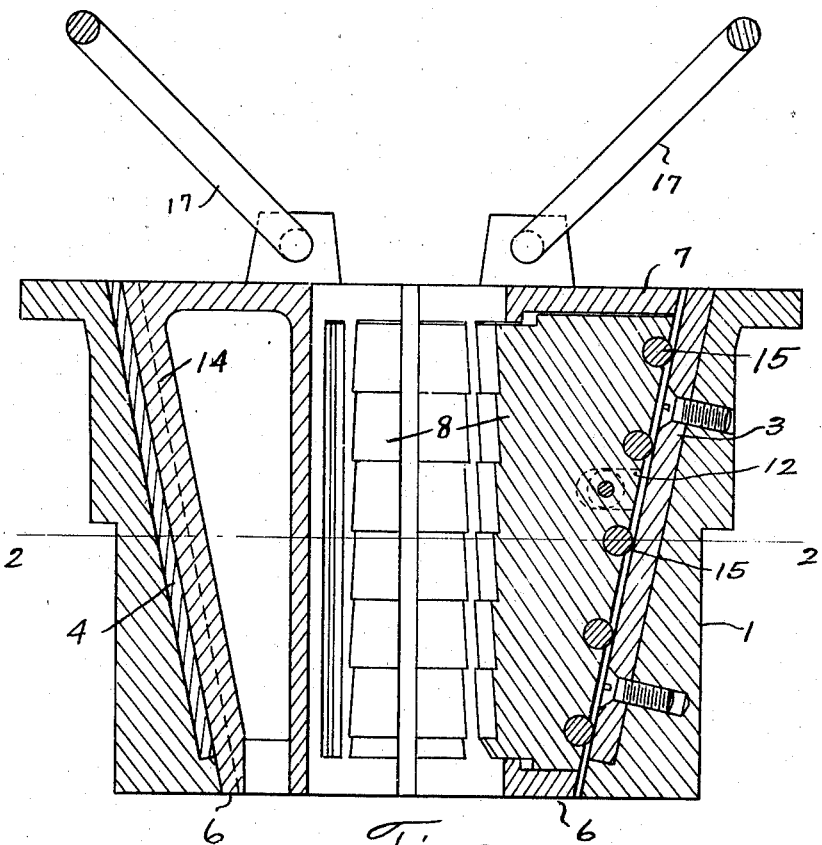
Figure 3 shows a vertical sectional view taken on the line 3—3 of Figure 2.
Figure 4:
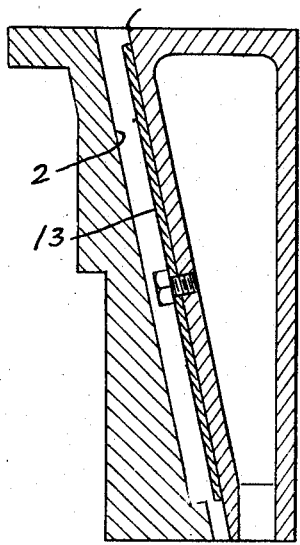
Figure 4 shows a sectional view taken on the line 4—4 of Figure 2.

Referring now more particularly to the drawings, wherein like numerals of reference designate similar parts in each of the figures, the numeral 1 designates the slip ring, adapted to seat in the opening of a rotary table, and having the internal downwardly converging wall 2, with the vertical tracks 3 secured thereto and spaced apart therearound. Fastened to opposite sides of this wall 2 are the guides 4, 4, whose inner sides have the lengthwise dovetailed grooves 5, 5.

The pipe holding slip is composed of a plurality of sections 6, 6, preferably two in number. Each section includes a cage, as 7, and jaws, as 8, mounted in the cage. The cage of each section is preferably cast as a unit and has the spaced, radial slots 9 therein to receive the jaws 8. These slots are preferably rectangular both in vertical, as well, as in cross sectional contour, and the jaws 8 are of a form to fit snugly through said slots, but to move radially therein. The material of the cage, between said slots, is cored out, as much as possible to conduce to lightness but not to sacrifice the strength of the cage. Each jaw has a transverse rivet 10 with a projecting enlarged head 11 which works in a radial slot 12 in the adjacent wall of the cage and the outer ends of these slots 12 are closed by the thin metal plates 13 which are fastened to the cage between the jaws.

Each cage 7 has an exterior, vertical tenon 14 adapted to fit into the corresponding groove 5 to hold the jaws in alignment with the corresponding tracks 3, as well as to prevent the slips from turning in the ring 1.

The outer sides of the jaws 8 taper inwardly to conform to the taper of the inner wall 2 of the slip ring, and have the anti-friction bearings 15 which ride on the corresponding tracks so that the jaws will securely grip the pipe and said bearings prevent the slips from wedging so tightly around the pipe to be held that their removal will be difficult. Some of the jaws 8 have vertical teeth 16, on their inner edges to grip the pipe to be held to prevent it from turning, while the inner edges of the other jaws are formed to engage the pipe and hold it suspended in a well bore.

Each section of the slip is provided with a suitable handle, or bail, 17 by means of which the slip sections may be handled independently.

What I claim is:—

1. A pipe holding slip formed of a plurality of sections, each section including a cage having slots extending therethrough radially and radially movable jaws mounted in said slots.

2. A pipe holding slip formed of a plurality of independent sections, each section including a cage having slots which extend entirely therethrough radially, radially movable jaws mounted in said slots, the inner edges of some of said jaws having vertical teeth.

3. A pipe holding slip formed of a plurality of sections, each section including a cage having a plurality of slots which extend entirely therethrough radially and pipe engaging jaws mounted to move radially in said slots.

4. In a pipe holding slip an arcuate cage having radial slots, pipe engaging jaws mounted in said slots and anti-friction bearings carried in grooves in the outer sides of said jaws.

5. A pipe holder including a slip ring, a plurality of vertically spaced tracks carried by the inner wall thereof and having downwardly converging bearing surfaces, a pipe holding slip adapted to be mounted in said ring and including jaws whose outer faces bear against said respective bearing surfaces.

6. A pipe holder including a slip ring, a plurality of spaced tracks carried therein and having downwardly converging bearing surfaces, a pipe holding slip adapted to be mounted in said ring and including jaws whose outer faces bear against said respective bearing surfaces and means preventing the rotation of said slip relative to said ring.

7. A pipe holder including a slip ring having a downwardly converging inside wall, spaced tracks carried by said wall, a slip having a plurality of radially movable jaws aligned with said tracks.

8. A pipe holder including a slip ring having a downwardly converging inside wall, spaced tracks carried by said wall, a slip having a plurality of radially movable jaws aligned with said tracks, anti-friction bearings mounted in said jaws and bearing against said tracks.

9. A pipe holder including a slip ring having a downwardly converging inside wall, spaced tracks carried by and projecting inwardly from said wall, a slip having a plurality of radially movable jaws aligned with said tracks and means maintaining such alignment.

10. A pipe holder including a slip ring having a downwardly converging inside seat, a slip formed of a plurality of sections and adapted to seat in said seat, each section having radially movable jaws and antifriction bearings mounted in said jaws and bearing against said seat.

In testimony whereof I have signed my name to this specification.

MONROE W. CARROLL.